United States Patent
Gerbic

[15] 3,669,142
[45] June 13, 1972

[54] EXPANSIBLE TUBE VALVE WITH LOW PRESSURE BLEED

[72] Inventor: Charles C. Gerbic, San Anselmo, Calif.
[73] Assignee: Grove Valve and Regulator Company, Oakland, Calif.
[22] Filed: Oct. 16, 1970
[21] Appl. No.: 81,311

[52] U.S. Cl. ..........................137/489, 251/5, 251/24
[51] Int. Cl. ....................................................G05d 16/16
[58] Field of Search ..............137/489, 500, 503; 251/61.1, 251/5, 484.2, 484.4, 24, 25

[56] References Cited

UNITED STATES PATENTS

| | | | |
|---|---|---|---|
| 2,360,873 | 10/1944 | Grove | 251/5 |
| 2,650,607 | 9/1953 | Bryant | 251/5 X |

FOREIGN PATENTS OR APPLICATIONS

| | | | |
|---|---|---|---|
| 255,794 | 1/1949 | Switzerland | 251/24 |
| 215,348 | 10/1957 | Australia | 137/489 |

Primary Examiner—M. Cary Nelson
Assistant Examiner—Robert J. Miller
Attorney—Melvin R. Stridham

[57] ABSTRACT

A pressure regulating system including a main valve with an expansible tube stretched over a cylindrical barrier so that flow occurs around the barrier only when a pressure fluid in a control chamber around the tube is overcome by upstream pressure. A pilot valve senses downstream pressure and opens when it drops to a predetermined level to exhaust the control chamber to a low pressure zone. Flow around the barrier is increased by evacuating the control chamber to a zone within the valve housing at a pressure lower than downstream. This occurs in a zone wherein the static pressure of the downstream fluid line is converted by the flowing stream to a high velocity, low static pressure. In areas where an atmospheric bleed is not objectionable, a second pilot valve may be provided to exhaust the control chamber to atmosphere if downstream pressure drops to a set lower level.

15 Claims, 2 Drawing Figures

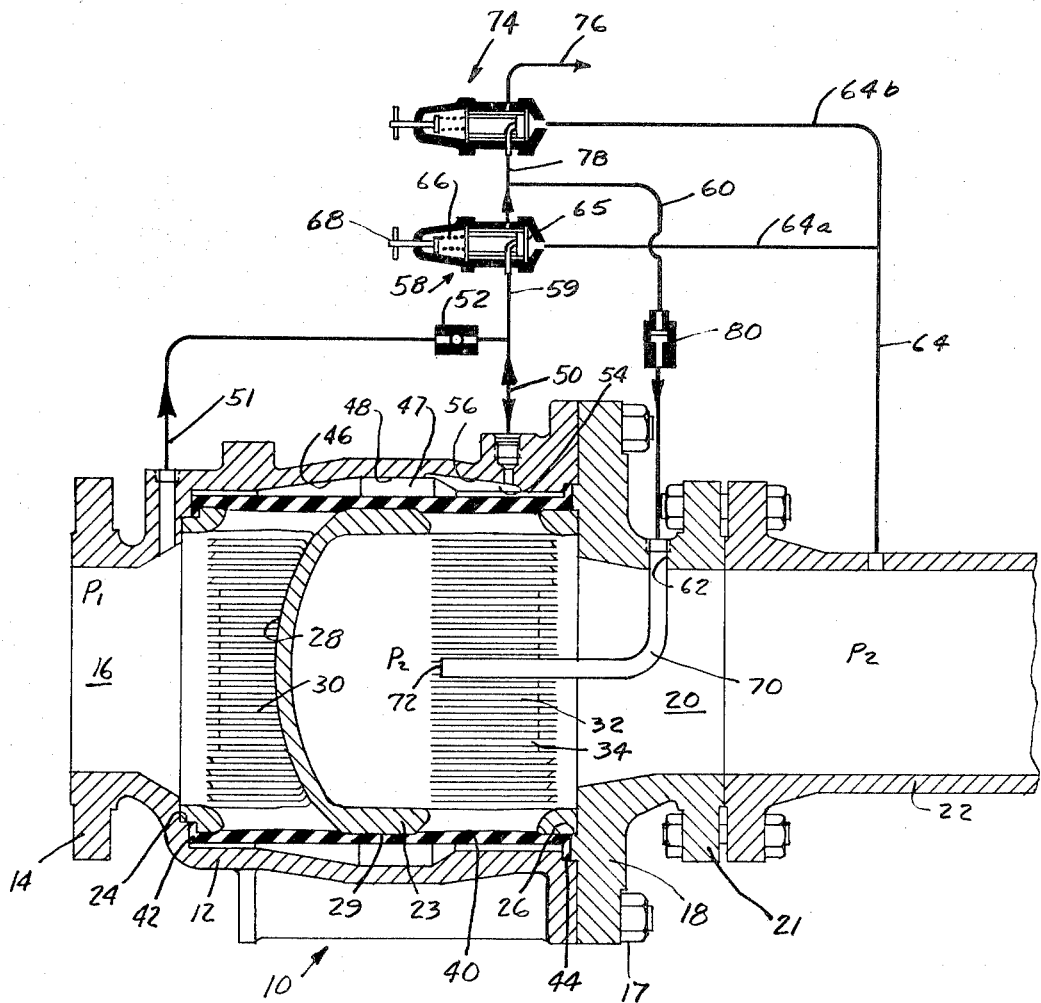

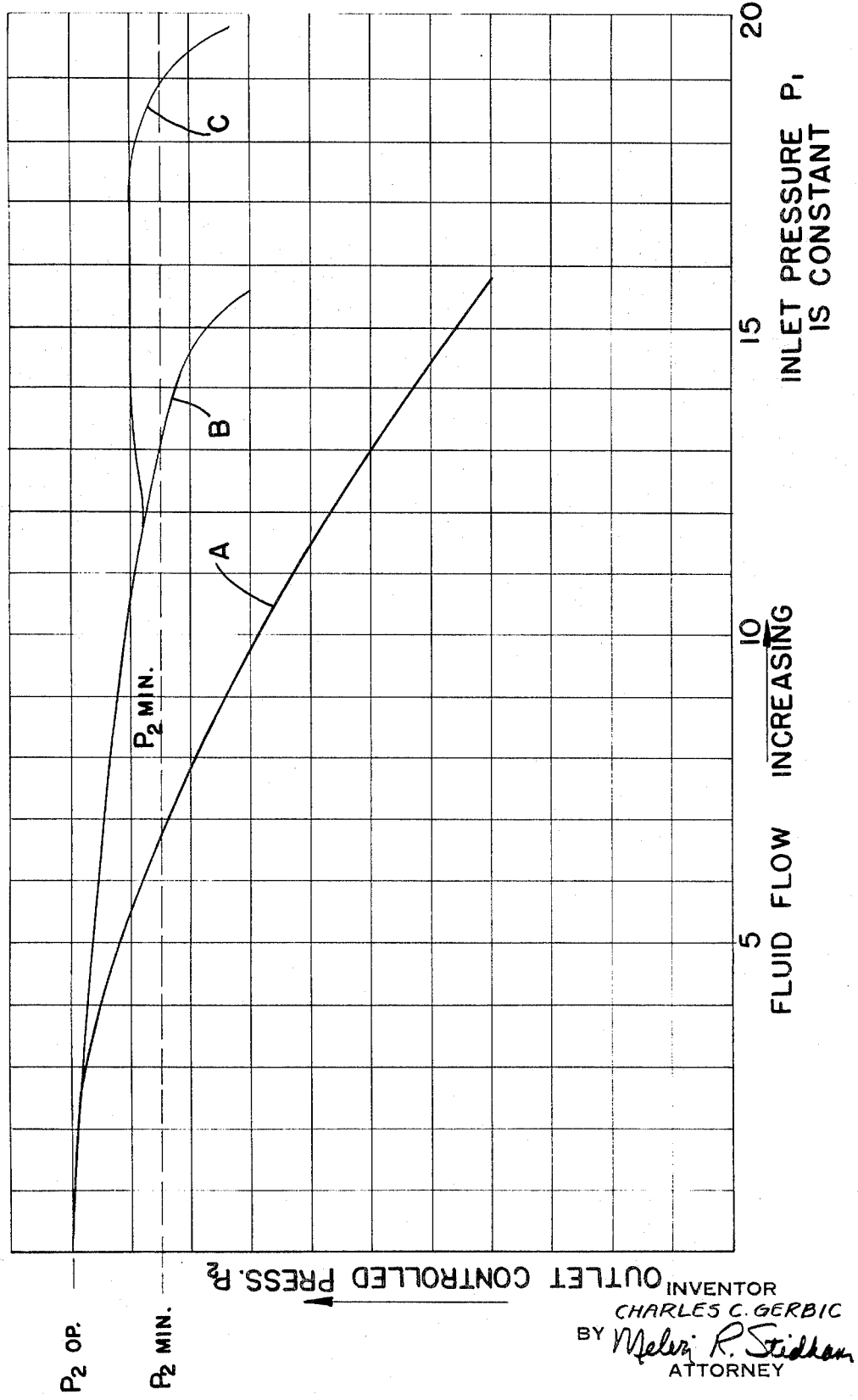

3,669,142

EXPANSIBLE TUBE VALVE WITH LOW PRESSURE BLEED

BACKGROUND OF THE INVENTION

This invention relates to a pressure regulating system and more particularly, to a system including an expansible tube type valve with a surrounding jacket for a control pressure fluid which is evacuated by the opening of a pilot valve in response to downstream pressure deterioration.

Expansible tube type valves have been employed with considerable success in pressure regulating systems. The expansible tube is carried on a cylindrical core sleeve which has two axially spaced inlet and outlet series of through openings around it with an intermediate barrier blocking the flow axially through the core sleeve. A control pressure fluid is in a jacket around the tube normally to prevent expansion of the tube away from the core sleeve barrier. The control pressure fluid may be introduced from the upstream line so that pressures inside and outside of the tube are balanced. In such case, the tension in the tube stretched over the core sleeve maintains the tube sealed around the barrier. In a duct connecting the jacket to a low pressure zone is a pilot valve which is sensitive to downstream pressure. Hence, if the downstream pressure falls below a predetermined level, the jacket is bled to the low pressure zone enabling upstream pressure within the tube to overcome the now-lower jacket control pressure and flow around the barrier to the downstream line.

Normally, there are only two pressure zones to which the jacket controlled fluid may conveniently be bled, i.e., the atmosphere and the downstream flow passage. In many installations, exhaust to the atmosphere is objectionable for a number of reasons, including environmental contamination and fire hazard. The downstream passage affords a convenient receptacle for evacuation of the jacket controlled fluid but, unfortunately, this imposes certain restrictions on the operation of the system. Specifically, the pressure drop between the jacket and the downstream passage and hence, between the upstream passage and the jacket, may be insufficient to insure full tube expansion, thus restricting the capacity of the valve. It is highly desirable to achieve a maximum fluid flow within the range of permissible drop in controlled outlet pressure.

OBJECTS OF THE INVENTION

It is an object of this invention to provide an expansible tube type regulator system with a jacket bleed to a zone at a pressure lower than that of the downstream passage.

It is a further object of this invention to utilize a low static pressure zone generated by conversion of static pressure to velocity pressure.

It is a further object of this invention to provide an expansible tube type valve under control of one pilot valve to bleed the jacket to a contained low pressure zone and a second pilot valve to bleed to atmosphere.

It is a further object of this invention to provide an expansible tube type valve with bleed ducts to both a contained low pressure zone and the atmosphere, with pilot valves in both ducts being selectively set to operate sequentially, or to bleed exclusively either to the atmosphere or to the contained zone.

Other objects and advantages of this invention will become apparent from the description following when read in conjunction with the accompanying drawings.

BRIEF SUMMARY OF THE INVENTION

In accordance with this invention, the pressure regulating system includes an expansible tube type valve comprising a flexible, expansible tube stretched over a cylindrical core sleeve having consecutively, a series of upstream slots, a cylindrical barrier blocking axial flow and a series of downstream slots. The expansible tube is sealed between the core and the housing at both ends so that flow is possible only by stretching the tube away from the central barrier, whereby upstream fluid may flow out through the upstream slots around the barrier and back in through the downstream slots.

In a chamber or jacket around the tube, a control pressure normally prevents expansion of the tube for flow of fluid and, conveniently, the control pressure may simply be fed through from the upstream line. Hence, there is a balance of pressure between the upstream side of the core barrier and the jacket, and flow is prevented by the hoop tension in the sleeve stretched over the core.

A pilot valve which senses downstream pressure and opens when the downstream pressure falls below a predetermined level opens to bleed the jacket to a zone of low pressure. It has been determined that, particularly at high flow, a zone at a static pressure lower than that in the downstream line exists within the core sleeve on the downstream side of the barrier at approximately the axis. This low static pressure condition is generated by the radially inward flow of fluid converting the previously high static fluid pressure to a lower static fluid pressure. This invention contemplates utilization of this low static pressure zone by providing a bleed tube which opens the outlet of the pilot valve to it, thus providing a maximum pressure drop between the upstream and jacket pressures without exhausting fluid outside of the system.

As a further embodiment of this invention, there is provided for use where atmospheric exhausts are not objectionable, a second pilot valve, also sensitive to the downstream pressure which connects the outlet of the first valve to the atmosphere. The provision of two pilot valves affords considerable flexibility in operation in that the second valve may be set to operate at a slightly lower pressure to operate sequentially with and to supplement the first pilot valve. Alternatively, they may be set relative to each other so that the entire bleed is to the atmosphere, or the second pilot valve may simply be set so as to render it completely inactive in locations where atmospheric bleed is unacceptable.

BRIEF DESCRIPTION OF THE DRAWING

FIG. 1 is a section view of an expansible tube type valve in a pressure control system shown schematically; and FIG. 2 is a graph depicting the performance of the system.

DESCRIPTION OF A PREFERRED EMBODIMENT

Referring now to FIG. 1, the expansible tube type valve or regulator 10 employed in the pressure regulating system of this invention includes a generally cylindrical housing 12 having an upstream hub 14 provided with a central flow passage 16. Secured onto the downstream end of the housing 12 as by means of bolts 17, is a closure plate 18 carrying a downstream hub with an outlet flow passage 20 and a flange 21 for connection into the pipeline 22. A core sleeve 23 is positioned within the housing 12 as by seating within circular recesses 24 and 26 which are formed in the upstream wall of the housing 12 and the downstream closure plate 18 to provide annular shoulders within which the opposite ends of the core sleeve 23 are retained.

The core sleeve 23 includes a dam or barrier 28 that extends completely across the inside of the sleeve 23 with an outer, cylindrical sealing surface 29, to prevent flow of fluid directly therethrough, but flow around the dam is permitted by spaced series of inlet and outlet slots 30 and 32 alternating with ribs 34. The ribs 34 and central barrier 28 are normally snugly embraced by an expansible tube or sleeve 40 having an inturned flange 42 at the upstream end that is clamped and sealed between the core sleeve 23 and the body 12, and an outturned flange 44 at the downstream end that is clamped between the body 12 and the downstream closure plate 18.

Adjacent the upstream end of the inlet series of slots 30, the inner surface of the regulator body 12 is tapered outward at 46 to form a central control chamber or jacket 47 defined by the larger diameter, generally cylindrical inner surface 48. A control fluid may be delivered to the chamber through a duct 50 from a suitable source such as the upstream flow passage 16 from which the fluid $P_1$ may be tapped off through the fitting 51 and delivered through a variable orifice 52 to create a pressure drop under flow when the chamber or jacket 47 is depressurized. Thus, in operation, the control pressure in the chamber augments the hoop tension in the stretched resilient sleeve or tube 40 normally to seal against the central barrier 28 and prevent any flow of fluid around it. However, should the pressure of the control fluid in the chamber 47 be reduced to a level wherein the upstream pressure can overcome the tube tension, the tube 40 is expanded away from the sealing surface 29 to permit flow of fluid out through the slots 30, around the barrier 28 into the downstream slots 32 and out the downstream passage 20.

For use in gas systems, the inner surface of the housing 12 is modified by providing an expansion blocking surface 54 which is just slightly larger in diameter than the expansible tube 40 and extends axially over much of the downstream side of the slotted sleeve core 22. That is, a substantial portion of the expansible tube on the outlet side of the slotted sleeve is embraced by the blocking surface 54. The blocking surface is effective to dampen the vibrations of the tube 40 that are set up by the flow of fluid around the barrier 28. This reduces the amplitude of the vibrational waves at the outlet end of the tube 40 and minimizes their effect in returning and building up trailing vibrational waves moving from the inlet end toward the outlet end of the tube. With the control fluid inlet 50 opening into the blocking surface 54, a groove 56 is provided from the control gas inlet 50 to the full expansion chamber 47 so as to insure the free and continuous exposure of the tube 40 to the control gas even though the tube 40 is expanded into firm contact with the blocking surface 54.

Included in the fluid regulating system is a pilot valve 58, the inlet of which 59 is connected to line 50 and the outlet of which is connected to line 60, opening through port 62 in the downstream hub 21, of the valve 10. The pilot valve is sensitive to downstream pressure $P_2$ in the pipeline 22 and a duct 64, 64a exposes the downstream pressure $P_2$ to a diaphragm 65 that operates the valve 58 in opposition to a spring 66, which may be adjusted at 68 to any predetermined pressure.

The structure as thus far described is in current use and its operation will now be described. With the downstream pressure $P_2$ at the desired level, the expansible tube is in its sealing position shown in FIG. 1 with the chamber 47 loaded by upstream pressure $P_1$ through the duct 50, 51 balancing the pressure in the upstream flow passage 16. In this condition, the hoop tension in the tube stretched around the sealing surface 29 is sufficient to maintain a seal and prevent flow from upstream flow passage 16 to the downstream 20.

In the event that downstream pressure $P_2$ falls below the predetermined level set by the pilot valve 58, the force against the diaphragm 65 will be overcome by spring 66 to open the pilot valve 58 and allow the chamber 47 to be evacuated through the ducts 50 and 60 to the port 62 in the downstream flow passage 20. While this occurs, the pressure drop across the variable orifice 52 in the duct 51, prevents pressurization of the chamber 47 as long as there is flow in the duct 50, 59. When the downstream pressure $P_2$ reaches the desired level, the force against the diaphragm will overcome the spring 66 to close the valve. Thereafter, fluid flowing through the variable orifice 52 will gradually elevate the pressure in the chamber 47 to balance that in the upstream line 16 and allow the expansible tube 40 to contract into firm sealing engagement around the barrier 23.

It has been determined that when the expansible tube is forced away from the barrier 23, the fluid flowing radially inward through the downstream slots 32 and particularly at high flow rates, converts the static pressure downstream of the barrier 23 into a high velocity, low static pressure zone $P_z$ at a static pressure lower than the downstream static pressure $P_2$. Therefore, in accordance with this invention, there is provided a bleed tube 70 connected into the port 62 to extend upstream therefrom on the axis of flow passage 20 opening in a zone near the radial plane of the leading ends of the downstream slots 32. With the bleed tube so disposed, the pressure drop between the chamber 47 and the low pressure evacuation zone $P_z$ near the discharge opening 72 of the bleed tube 70 is maximized without bleeding to the atmosphere. This high pressure drop will facilitate a more effective evacuation of the chamber 47 which, in turn, produces a greater pressure drop between the upstream pressure and that in the chamber 47 to enable full expansion of the tube 40. This effects a concomitant increase in the rate of flow around the barrier 28.

Referring now to FIG. 2, there is shown a graph which depicts the vastly improved operation with the low pressure bleed tube 70. The curve A in FIG. 2 represents the deterioration in control pressure with increase in flow rate, measure in any suitable units, such as standard cubic feed per minute (SCFM), with inlet pressure $P_1$ constant. The curve B shows improved performance with the low pressure bleed tube 70 installed. A comparison of the curves A and B will show that at the minimum tolerable outlet controlled pressure level ($P_2$ min.), which should be equaled or exceeded throughout operation, the flow capacity is almost doubled with the low pressure bleeder tube installed. As a specific example, in a particular installation an operator may tolerate no more than 15 percent pressure droop from the desired control pressure $P_2$ op., and with the conventional downstream bleed, this amount of droop occurs while realizing a flow rate of only 6½ units of fluid flow. Tests have shown, as depicted on the FIG. 2 graph, that with the low pressure bleed zone tube 70 installed, 13 units of fluid flow may be realized before there is a 15 percent droop in outlet pressure $P_2$.

Referring again to FIG. 1 in areas wherein a bleed to the atmosphere is not objectionable, a considerable flexibility in operation is possible by addition of a second pilot tube 74 with an outlet duct 76 open to the atmosphere and an inlet duct 78 connected to the outlet of the first pilot valve 58. A check valve 80 is provided in the duct 60 to prevent reverse flow from the bleeder tube 70. As in the first pilot valve 68, the second pilot valve 74 senses the downstream pressure through a duct 64, 64b.

The second pilot valve 74 may be set at a pressure level slightly below that of the first pilot so that if the downstream pressure $P_2$ falls below a level that can be compensated efficiently with the internal low pressure bleed tube 70, the bleed may be switched to atmosphere. In such event, the second pilot valve 74 is also opened and the chamber 47 is evacuated through duct 50, the still open pilot valve 58, the duct 78 and through pilot valve 74 to the atmospheric bleed 76.

Referring again to FIG. 2, the graph shows at the merger of curves B and C how the sequential operation of the second pilot valve bleeding to atmosphere improves performance of the system. There, the controlled pressure $P_2$ follows the curve B droop until just before the minimum controlled pressure $P_2$ min. level is reached. Then, the second pilot 74 is operated and the controlled pressure $P_2$ follows the curve C at an extended, substantially undiminished level until almost 18 units of fluid flow are realized and then commences to droop, falling to the minimum level $P_2$ min. only after achieving a flow of 18½ units. Thus, the combined internal low pressure zone bleed — atmospheric bleed systems has produced a 200 percent improvement in fluid flow within the tolerable controlled pressure-droop range.

If the atmospheric bleed should be objectionable, one may merely set the second pilot at such a level that it will never be opened. Conversely, if exclusively atmospheric bleed is preferred, one may merely set the second pilot valve 74 so that it will open first. Hence, when the first pilot valve 58 is opened at the set pressure, it will evacuate to atmosphere through the open second pilot valve 74.

While this invention has been described in conjunction with preferred embodiments thereof, it is obvious that modifications and changes may be made by those skilled in the art without departing from the spirit and scope of the invention.

What is claimed is:

1. In an expansible tube valve comprising:
   a housing having inlet and outlet flow passages,
   a core sleeve secured in said housing with opposite ends thereof aligned with said flow passages, two axially spaced, inlet and outlet series of through openings around said core sleeve, a cylindrical barrier extending across said core sleeve intermediate said inlet and outlet series of openings, a sealing surface around said barrier, a flexible, expansible tube having an intermediate sealing portion normally snugly embracing said sealing surface and sealed around said housing at opposite ends thereof, and a port in said housing for introducing a control pressure fluid around said expansible sleeve, said housing being adapted for connection to a pilot valve duct system which opens in response to deterioration of pressure downstream of said outlet passage below a predetermined level, the improvement comprising:

a bleed duct adapted to connect the outlet of said pilot valve system to a zone at a pressure lower than said downstream pressure within said core sleeve adjacent the radial plane of the upstream portions of said outlet through openings.

2. The combination defined by claim 1 wherein:

said outlet through openings are configurated as longitudinal slots, and said bleed duct opens into the interior of said core sleeve adjacent the radial plane of the upstream ends of said slots.

3. In a pressure regulating system comprising:

an expansible tube valve, a pilot valve operable by a controlled fluid pressure to open when said controlled pressure falls to a predetermined level, sensing duct means connecting said pilot valve to control pressure of fluid downstream of said expansible tube valve, said expansible tube valve comprising:

a housing having inlet and outlet flow passages, a cylindrical barrier extending partially across the interior of said housing intermediate said inlet and outlet flow passages, a sealing surface around said barrier, a flexible, expansible tube having an intermediate sealing portion normally snugly embracing said sealing surface and sealed around said housing at opposite ends thereof, a port in said housing introducing a control pressure fluid into a chamber around said expansible tube, the improvement comprising:

exhaust duct means connecting said chamber to the inlet of said pilot valve, and bleed duct means connecting the outlet of said pilot valve to a zone within said housing near the downstream side of said barrier at a pressure lower than said controlled fluid pressure.

4. The combination defined by claim 3 including:

a core sleeve secured in said housing with opposite open ends thereof aligned with said flow passages, two axially spaced, inlet and outlet series of through openings around said sleeve, said barrier extending across said sleeve intermediate said inlet and outlet openings.

5. The pressure regulating system defined by claim 4 wherein:

said outlet through openings are configurated as longitudinal slots, and said bleed duct opens adjacent the radial plane of the upstream ends of said slots.

6. The pressure regulating system defined by claim 4 wherein:

said bleed duct opens at approximately the axis of said core sleeve.

7. The pressure regulating system defined by claim 3 including:

a second pilot valve, second sensing duct means connecting said second pilot valve to control pressure of fluid downstream of said expansible tube valve, a second exhaust duct connecting said bleed duct to the inlet of said second pilot valve, a check valve in said bleed duct preventing flow of fluid away from said lower pressure zone, and a second bleed duct connecting the outlet of said second pilot valve to the atmosphere.

8. The pressure regulating system defined by claim 7 wherein:

said second pilot valve is adjustable to open selectively at pressure levels higher or lower than said predetermined level.

9. The pressure regulating system defined by claim 7 wherein:

said first pilot valve is adjustable to open selectively at pressure levels at or below said predetermined level.

10. The combination defined by claim 1 wherein:

said bleed duct opens at approximately the axis of said core sleeve.

11. The combination defined by claim 1 wherein:

the downstream side of said barrier is concave.

12. The combination defined by claim 3 wherein:

the downstream side of said barrier is concave.

13. In a pressure regulating system comprising:

an expansible tube valve, a first pilot valve operable by a controlled fluid pressure to open when said controlled pressure falls to a predetermined level, first sensing duct means connecting said pilot valve to control pressure of fluid downstream of said expansible tube valve, said expansible tube valve comprising:

a housing having inlet and outlet flow passages, a cylindrical barrier extending partially across the interior of said housing intermediate said inlet and outlet flow passages, a sealing surface around said barrier, a flexible, expansible tube having an intermediate sealing portion normally snugly embracing said sealing surface and sealed around said housing at opposite ends thereof, a port in said housing introducing a control pressure fluid into a chamber around said expansible tube, the improvement comprising:

exhaust duct means connecting said chamber to the inlet of said first pilot valve, first bleed duct means connecting the outlet of said first pilot valve to a low pressure zone downstream of said barrier, a second pilot valve, second sensing duct means connecting said second pilot valve to control pressure of fluid downstream of said expansible tube valve, a second exhaust duct connecting said bleed duct to the inlet of said second pilot valve, a check valve in said bleed duct preventing flow of fluid away from said low pressure zone, and a second bleed duct connecting the outlet of said second pilot valve to the atmosphere.

14. The pressure regulating system defined by claim 13 wherein:

said second pilot valve is adjustable to open selectively at pressure levels higher or lower than said predetermined level.

15. The pressure regulating system defined by claim 13 wherein:

said first pilot valve is adjustable to open selectively at pressure levels at or below said predetermined level.

* * * * *